US006776023B2

(12) United States Patent
Dubois

(10) Patent No.: US 6,776,023 B2
(45) Date of Patent: Aug. 17, 2004

(54) METHOD FOR DETERMINING THE DEFORMATION AMPLITUDE OF A TOUCH PROBE

(75) Inventor: Daniel Dubois, Bienne (CH)

(73) Assignee: Saphirwerk Industrieprodukte AG, Brugg (CH)

(*) Notice: Subject to any disclaimer, the term of this patent is extended or adjusted under 35 U.S.C. 154(b) by 82 days.

(21) Appl. No.: 10/108,872

(22) Filed: Mar. 29, 2002

(65) Prior Publication Data
US 2002/0138999 A1 Oct. 3, 2002

(30) Foreign Application Priority Data
Apr. 3, 2001 (EP) .............................. 01201247

(51) Int. Cl.[7] .................................................. G01B 7/00
(52) U.S. Cl. ..................................................... 73/1.81
(58) Field of Search .......................... 73/1.79, 1.81, 73/789, 795, 849

(56) References Cited
U.S. PATENT DOCUMENTS 5,321,977 A 6/1994 Clabes et al.
5,594,668 A * 1/1997 Bernhardt et al. ............ 33/504
5,665,896 A * 9/1997 McMurtry ................. 73/1.75
5,806,201 A 9/1998 Feichtinger

FOREIGN PATENT DOCUMENTS

| DE | 39 33 575 A1 | 4/1991 |
| DE | 198 24 107 A1 | 12/1999 |
| WO | WO 00/60310 | 10/2000 |

OTHER PUBLICATIONS

"Korrektur der Taststiftbiegung bei Messungen mit Mehrkoordinaten–Messgeräten", by A. Weckenmann, G. Goch and H.–D. Springborn, in Feinwerktechnik & Messtechnik 87 (1979) 1, pp. 5–9.
"Messende Taster mit mehreren Freiheitsgraden", by W. Lotze, in Technische Rundschau, issue 50 (1992), pp. 20–25.

* cited by examiner

Primary Examiner—Robert Raevis
(74) Attorney, Agent, or Firm—Sughrue Mion, PLLC

(57) ABSTRACT

The invention concerns a method for calibrating a tool, of the touch probe type, used on a contact type measuring machine, in order to take account of its dynamic geometrical features.

Said method enables, in particular, the uncertainties associated with the bending deformation of said touch probe, to be precisely determined.

20 Claims, 2 Drawing Sheets

METHOD FOR DETERMINING THE DEFORMATION AMPLITUDE OF A TOUCH PROBE

The present invention concerns a method for calibrating a tool used on a contact type measuring machine, said machine including a mobile measuring head on which said tool is fixedly mounted, the tool including a support rod carrying a contact element or tip at a first end, and connection means assuring the link with said measuring head at the second end.

The invention relates more precisely to the implementation of such a method for calibrating a touch probe type measuring tool.

The use of a reference object for calibrating machine-tools including a measuring head carrying a touch probe has been known for a long time. Indeed, the use of such a reference object whose dimensions are known very precisely enables said measuring head to be calibrated with respect to three dimensional spatial coordinate measurements.

However, the type of calibration described above has certain uncertainties capable of adversely affecting the precision of subsequent measurements. Indeed, calibration performed in the prior art enables the spatial origin of measurements to be fixed but does not take account of certain uncertainties, such as uncertainties related to deformations of the touch probe which are added to the inherent measurement uncertainties. The measurement uncertainty "budget" for such a machine is thus increased since it is calculated to take account of the uncertainty associated with the final result, when said uncertainty is maximum. Consequently, the slightest decrease in one of the uncertainties occurring in a measuring method causes a corresponding decrease in the uncertainty budget.

Uncertainties affecting deformations of the touch probe are very slight, but because of the rapid development in technology and the increase in precision available in manufacturing and measuring methods, there is a permanent demand to limit all types of uncertainty as far as possible.

The measuring tool, or touch probe, is generally formed of two or three parts, which are connecting means, a support rod and a contact element. The uncertainties described above originate from the use of a contact element whose geometrical features are not ideal and from the various methods used for assembling the touch probe components.

The method currently used for assembling touch probe components is bonding, using an adhesive material. However, bonding has a drawback in that the distribution of the adhesive material on the two surfaces to be bonded prior to assembly cannot be controlled in a reliable manner. Thus, the orientation of the various components of the touch probe in relation to each other varies from one probe to another, as does the quality of adhesion. Consequently, the dynamic behaviour of two, theoretically identical, probes will not be the same, more particularly as regards bending.

The main object of the present invention is thus to overcome the drawbacks of the aforementioned prior art by providing a method enabling deformations of touch probe during the measurement cycle to be taken into account.

The invention therefore concerns a method for determining the amplitude of the deformations that a measuring tool of the type indicated hereinbefore undergoes in common use, such method including the steps consisting in:

a) fixing said touch probe onto a support by said connecting means, b) applying a force to a point of application located on a first part of said touch probe, c) measuring the deflection magnitude of said first part of said touch probe using a first measuring device, d) repeating steps a) to c) a plurality of times each time changing the points of application of the force and corresponding measurement, so as to obtain a radial distribution of the value of said bending which said touch probe undergoes, e) providing a report representative of the set of measurements obtained by implementing steps a) to d).

By "common use" is to be understood the average usual conditions undergone by the touch probe during a surface scanning or measuring cycle.

In a preferred embodiment, the force is applied on a first part of the contact element, whereas said measuring device is arranged on a second part of said contact element, located facing said first part. Furthermore, in the event that said measuring tool is a touch probe whose contact element is a ball, step b) above consists in applying pressure to a first point located substantially on the equator of said ball, whereas the corresponding magnitude of deflection of the ball is measured, using a comparator, in proximity to a second point of said ball diametrically opposite said first point. Consequently, step c) above then consists in calculating the bending which the touch probe undergoes in conditions close to real conditions of use.

Moreover, repeating steps b) and c) above a plurality of times enables the bending of said touch probe in all directions to be determined and thus radial distribution of the bending to be obtained, enabling the dynamic behaviour of said probe to be known entirely.

A second comparator may also be used during the measuring steps enabling the magnitude of deflections of said probe's connecting means to be determined with respect to the support and with respect to the contact element.

Likewise, a third comparator can be used enabling the magnitude of deflections of the end of said support rod located in proximity to the contact element, in particular with respect to the contact element itself to be determined. In this way, one can obtain precise, complete and detailed knowledge as to the dynamic behaviour of the touch probe. This advantageously enables one to determine more precisely than at the current time what uncertainties are involved as regards the measuring head and thus to greatly reduce the uncertainty budget of said measuring head. It is of course understood that in such case, the more one wishes to carry out measurements on a probe, the more advantageous it is to use an automatized method.

Consequently, the manufacturer of such measuring probes can define the dynamic behaviour of each probe which he wishes to market and provide a report representative of the results obtained in the form of a certificate, guaranteeing the level of uncertainties associated with said probe to the client. The user can thus combine this information with that subsequently obtained when the reference object is measured, to define the overall level of uncertainty of his machine-tool exactly.

The invention will be explained in more detail using the following description of an embodiment example made with reference to the annexed drawings, in which.

Figure 1:
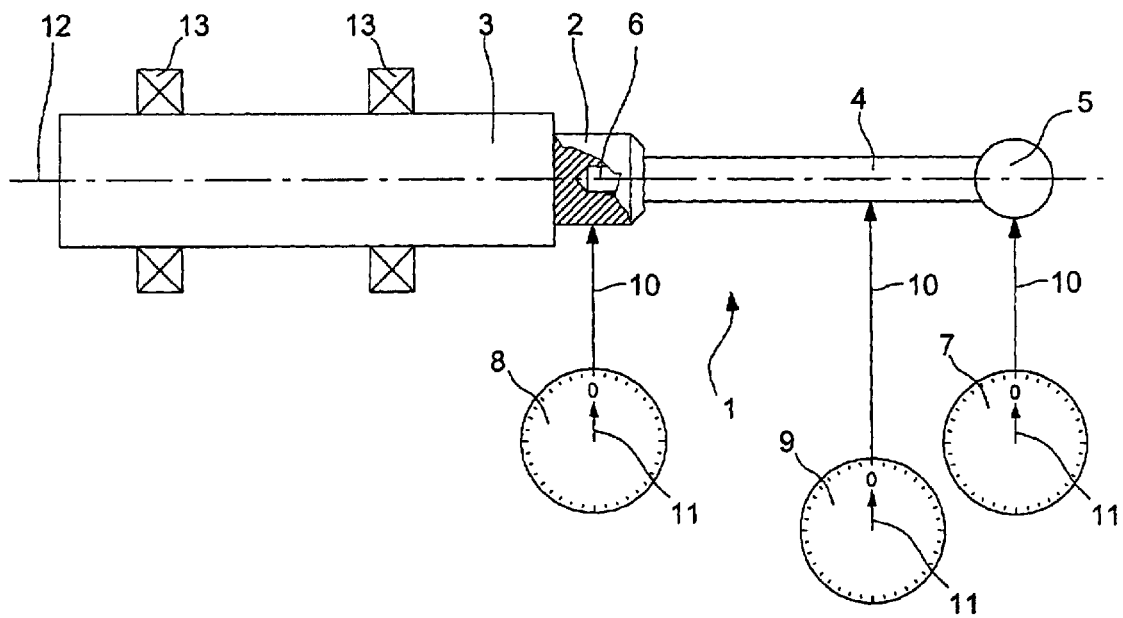
FIG. 1 is a simplified top view, a part of which is in cross-section, of a touch probe mounted on a support, for implementing the method according to the invention.

The three components of touch probe 1 can be distinguished in FIG. 1, i.e. connecting means 2, connected here to a support 3 of fixed position only a part of which is visible, support rod 4 and contact element or tip 5, which is a ball here.

It is of course clear that once calibration according to the invention has been performed, said touch probe can be used to carry out measurements and it is consequently arranged on a measuring head (not shown) in place of said fixed support 3.

Preferably, connecting means 2 and support rod 4 are made of a hard, light material, such as a cermet, tungsten carbide for example. These materials enable a probe having good mechanical properties as regards rigidity and lightness to be obtained, which are indispensable respectively for the accuracy and rapidity of the measurements.

Figure 2:
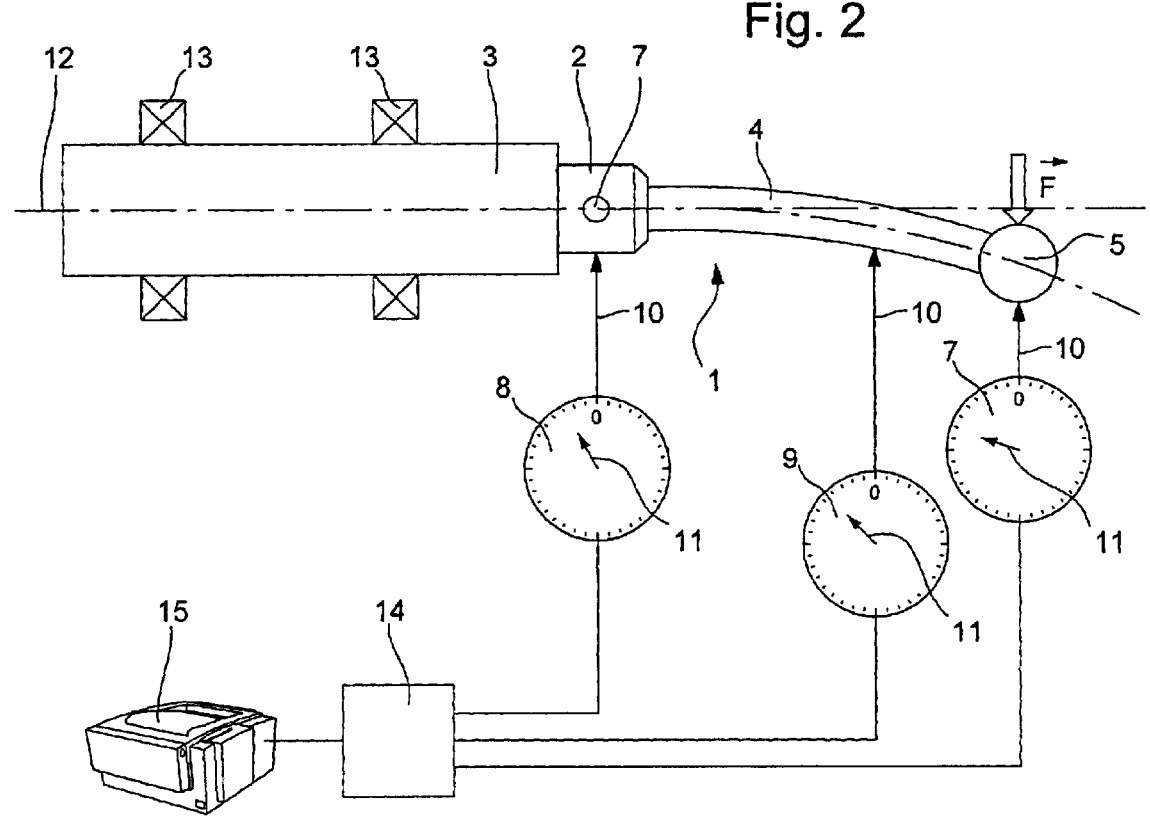
FIG. 2 is a simplified top view of the touch probe of FIG. 1, said probe being deformed, in a deliberately exaggerated manner for the sake of clarity, during a measuring step of the method according to the invention.

The assembly of these two parts is preferably achieved by laser welding or hooping. Connecting means 2 are of a conventional type, such as a cylindrical part carrying an outer threading on one side for forming the connection with the measuring head, here fixed support 3, and a bore on the other side for forming the connection 6 with support rod 4. It will also be observed that said connecting means 2 include two holes 7 (only one of which is visible in FIG. 2) used as grips for facilitating the tightening onto fixed support 3 or onto a measuring head.

Moreover, ball 54 must also be made of a hard, light material for the aforecited reasons, which is why a ceramic material or corundum is preferably used. These materials also have good resistance to friction wear, which is also indispensable for making a contact element. Said ball 5 is secured to support rod 4 by bonding or soldering, these techniques being both common and inexpensive. Bonding in this case poses fewer difficulties than for assembling support rod 4 onto connecting means 2, insofar as the two surfaces to be bonded are easily accessible, which thus enables the distribution of adhesive to be properly controlled.

Other embodiments of touch probe 1 may also be envisaged, such as using a support rod 4-connecting means 2 assembly manufactured in a single part. Likewise, other suitable materials could be used for manufacturing ball 5.

Three comparators 7, 8 and 9 are also shown schematically in FIG. 1, in addition to an arrow above each of said comparators symbolising mobile touch element 10, which activates hand 11 of said comparator. The application of pressure on said mobile touch element 10 generates a rotation of said hand 11 and the measurement of the corresponding deflection magnitude.

In order to implement the method according to the invention, said probe 1 is secured to fixed support 3, as can be seen in FIG. 1. Pressure of a value of approximately 3 Newton for example is then applied to a first point of said ball 5 close to its equator. This pressure corresponds to the value of the pressure said probe 1 undergoes during a conventional cycle of measurements. At the same time, comparator 7 arranged prior to application of said pressure on a second point of ball 5, opposite said first point, measures the magnitude of deflection of the ball caused by said pressure.

This first measurement thus enables the total bending deformation of probe 1 during operation to be determined, more precisely the bending deformation, which occurs between ball 5, and the fixed support 3.

In a preferred embodiment of the invention, a second comparator 8 is used, arranged on a point of the periphery of connecting means 2 in the median plane of said probe 1 defined by said two points of said ball 5, on the side of said second point. Said second comparator 8 enables the deflection magnitude of said connecting means 2, caused by application of said pressure, to be measured. One can then deduce the bending deformation of probe 1, occurring between ball 5 and connecting means 2.

In another preferred embodiment of the invention, a third comparator 9 is used, arranged on a point of the periphery of support rod 4 in said median plane on the side of said second point and in proximity to ball 5. Said third comparator 9 enables the deflection magnitude of the corresponding end of said rod 4 caused by application of said pressure, to be measured.

Generally, and in practice, the method is not limited to the measurements described hereinbefore, but consists rather in a repetition of all of these measurements, changing median plane at each new set of measurements, the passage from one median plane to the next consisting in a rotation through an angle of $\alpha=360/x$ about the axis of symmetry 12 of probe 1, where x corresponds to the number of desired measurements.

Of course, multiplying the measurements involves an increase in the duration of implementation of the method according to the invention, which is why it is preferable in such case to automatize said method. One may for example arrange support 3 on a rotating assembly symbolised by ball bearings 13 in FIGS. 1 and 2, and thus rotate it using a control unit (not shown), either discontinuously with an adjustable rotation pitch $\alpha$, or continuously. At the same time, the comparators can be connected to an electronic device for measuring and processing the results, such as a computer, designated by the reference 14 in FIG. 2. Said electronic device 14 may also be connected to a printer 15 which will print measurement reports, for example in the form of a diagram.

Figure 3:
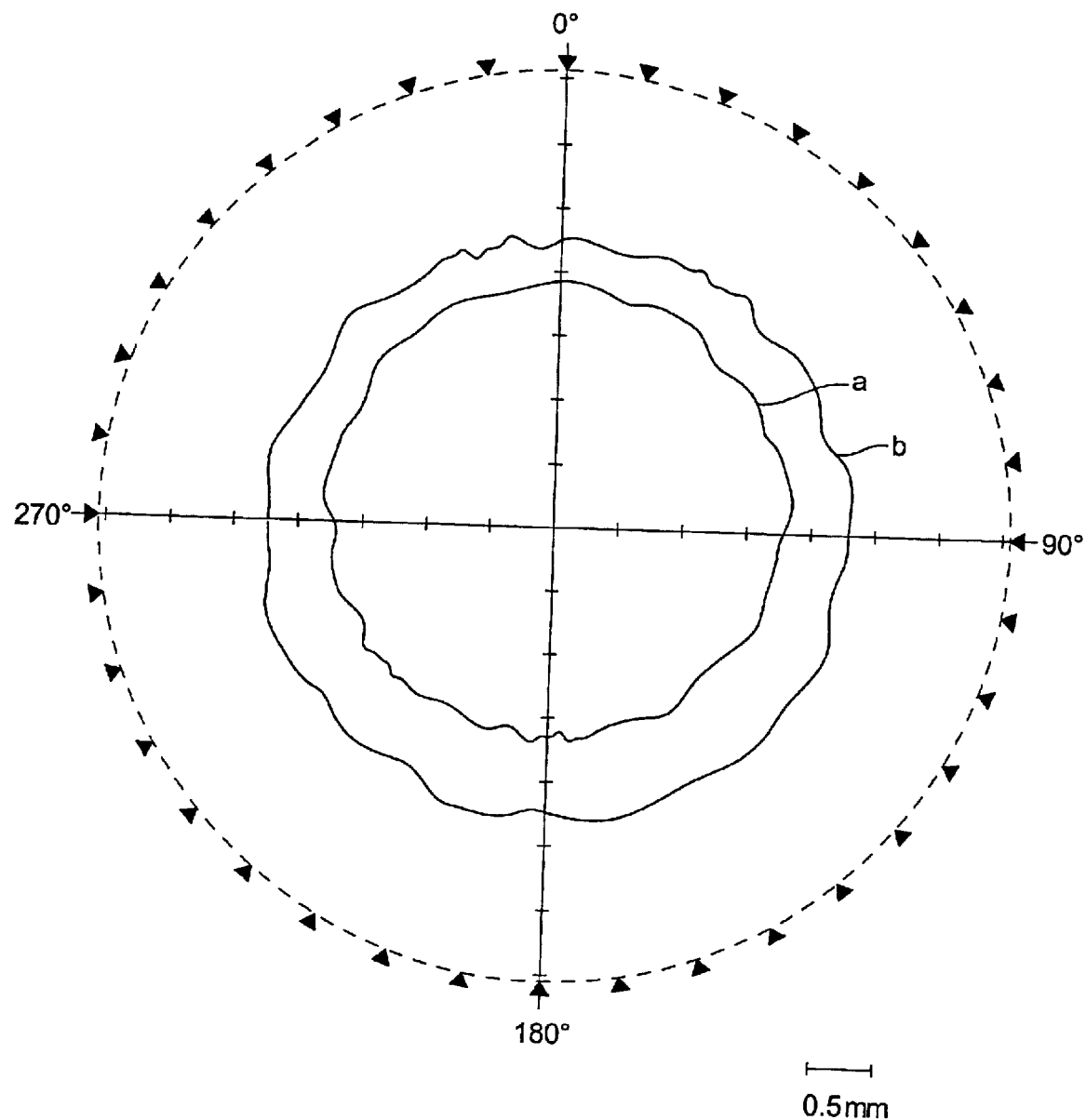
FIG. 3 is an example diagram showing the amplitude of the deflections undergone by the contact element with respect to its rest position, obtained by implementing the method according to the invention.

In this way, the probe manufacturer can obtain and provide to his clients information records as to the bending of the probe in all directions with respect to its axis of symmetry. An example of the type of diagram which can be produced for this purpose is shown in FIG. 3. This shows a first curve referenced a representing the deviation in sphericity of contact element 5, with respect to a perfect sphere of equal radius to the mean radius of said contact element 5, and measured on its equatorial periphery starting from a starting position corresponding to zero in the diagram. The second curve, referenced b, is a possible diagram of the measurement results obtained by implementing the method according to the invention. Each point on curve b represents, for a given angle with respect to said starting position, the amplitude of the deflection made by the contact element with respect to its rest position. In the example shown here, 36 measurements have been made, symbolised by small arrows, probe 1 having been rotated by 10 degrees between each of said measurements. Curve b was then obtained by extrapolation calculations made by electronic device 14.

The last variant described advantageously enables the behaviour of the probe to be precisely determined during a measurement cycle. In particular, it enables the complete behaviour of the various components of probe 1 to be known in relation to each other, in addition to the overall behaviour of said probe, particularly when bending. This knowledge enables the probe manufacturer to inform the client using said probes precisely as to the uncertainties to be taken into account for calculating the uncertainty budget. The manufacturer could market each of said probes with a certificate certifying the dynamic calibration and thus guaranteeing his clients a certain uncertainty level for each probe. A certificate of this type tells the user of such a probe the exact uncertainties on the geometry of said probe which he has to take into account in order to calculate his budget of uncertainty.

The preceding description corresponds to preferred embodiments of the invention and should in no way be considered limiting. The probe manufacturer could for example judge himself, on a case-by-case basis, the number of measurements to be made on a probe in order to obtain data representative of the behaviour of said probe. Moreover, the mode of assembly described for the various probe components corresponds to the preferred embodiment, but the method according to the invention can be applied to all types of probe.

What is claimed is:

1. A method for determining, in common use, the bending of a touch probe used on a contact measuring machine, said machine including a mobile measuring head on which said touch probe is intended to be fixedly mounted, the probe including a support rod carrying a contact element at a first end, and connection means assuring the link with said measuring head at the second end, said method including the steps of:
   a) fixing said touch probe onto a fixed support by said connecting means,
   b) applying a force to a point of application located on a first part of said touch probe,
   c) measuring the deflection magnitude undergone by said first part of said touch probe using a first measuring device,
   d) repeating steps a) to c) a plurality of times, each time changing the points of application of the force and corresponding measurement, so as to obtain a radial distribution of the value of said bending which said touch probe undergoes,
   e) providing a report representative of all the measurements obtained by implementing steps a) to d).

2. The method according to claim 1, wherein, in step b), said first part onto which said force is applied is located on said contact element.

3. The method according to claim 2, wherein, during implementation of step c), a second measuring device is used to measure the deflection magnitude of said connecting means.

4. The method according to claim 3, wherein, during implementation of step c), a third measuring device is used to measure the deflection magnitude of said first end of the support rod located in proximity to said contact element.

5. The method according to claim 2, wherein, when step c) is being implemented, the deformation measurement includes measurement of the deflection magnitude of a second part of the contact element.

6. The method according to claim 5, wherein said second part is located opposite said first part.

7. The method according to claim 6, wherein said contact element is a ball and said first part corresponds to a first point substantially located on the equator of said ball, said second part being a second point diametrically opposite said first point, wherein said force is an application of pressure, and wherein said deformation is a radial bending and said measuring device is a comparator.

8. The method according to claim 7, wherein said report representative of the set of measurements takes the form of a certificate.

9. The method according to claim 8, wherein the value of said force is substantially equal to the value of the mean force which said touch probe undergoes during a conventional measuring cycle.

10. The method according to claim 9, wherein, during implementation of step c), a second measuring device is used to measure the deflection magnitude of said connecting means.

11. The method according to claim 10, wherein, during implementation of step c), a third measuring device is used to measure the deflection magnitude of said first end of the support rod located in proximity to said contact element.

12. The method according to claim 8, wherein, during implementation of step c), a second measuring device is used to measure the deflection magnitude of said connecting means.

13. The method according to claim 12, wherein during implementation of step c), a third measuring device is used to measure the deflection magnitude of said first end of the support rod located in proximity to said contact element.

14. The method according to claim 7, wherein the value of said force is substantially equal to the value of the mean force which said touch probe undergoes during a conventional measuring cycle.

15. The method according to claim 7, wherein, during implementation of step c), a second measuring device is used to measure the deflection magnitude of said connecting means.

16. The method according to claim 15, wherein, during implementation of step c), a third measuring device is used to measure the deflection magnitude of said first end of the support rod located in proximity to said contact element.

17. The method according to claim 6, wherein said report representative of the set of measurements takes the form of a certificate.

18. The method according to claim 1, wherein said report representative of the set of measurements takes the form of a certificate.

19. The method according to claim 1, wherein the value of said force is substantially equal to the value of the mean force which said touch probe undergoes during a conventional measuring cycle.

20. A method for determining, in common use, the bending of a touch probe used on a contact measuring machine, said machine including a mobile measuring head on which said touch probe is intended to be fixedly mounted, the probe including a support rod carrying a contact element at a first end, and connection means assuring the link with said measuring head at the second end, said method including the steps of:
   f) fixing said touch probe onto a fixed support by said connecting means,
   g) applying a force to a point of application located on a first part of said touch probe,
   h) measuring the deflection magnitude undergone by said first part of said touch probe using a first measuring device,
   i) repeating steps a) to c) a plurality of times, each time changing the points of application of the force and corresponding measurement, so as to obtain a radial distribution of the value of said bending which said touch probe undergoes, providing a report representative of all the measurements obtained by implementing steps a) to d), said report taking the form of a certificate comprising a diagram representing said radial distribution of said deflection magnitude with respect to the touch probe rest position.

* * * * *

UNITED STATES PATENT AND TRADEMARK OFFICE
CERTIFICATE OF CORRECTION

PATENT NO. : 6,776,023 B2
DATED : August 17, 2004
INVENTOR(S) : Daniel Dubois

It is certified that error appears in the above-identified patent and that said Letters Patent is hereby corrected as shown below:

Column 6,
Line 56, delete "steps a) to c)", and insert -- steps f) to h) --.
Line 62, delete "steps a) to d)", and insert -- steps f) to i) --.

Signed and Sealed this

Twenty-first Day of December, 2004

JON W. DUDAS
*Director of the United States Patent and Trademark Office*